United States Patent [19]

Saad

[11] 4,247,441

[45] Jan. 27, 1981

[54] PROCESS FOR PREPARING A SILICONE MOLDING COMPOSITION

[75] Inventor: William T. Saad, Burnt Hills, N.Y.

[73] Assignee: General Electric Company, Waterford, N.Y.

[21] Appl. No.: 10,876

[22] Filed: Feb. 9, 1979

[51] Int. Cl.$^3$ ............................................. C08K 5/07
[52] U.S. Cl. ...................... 260/32.8 SB; 260/33.4 SB; 260/33.6 SB; 260/33.8 SB; 260/34.2
[58] Field of Search ................. 260/33.6 SB, 33.8 SB, 260/33.4 SB, 32.8 SB

[56] References Cited

U.S. PATENT DOCUMENTS

| | | | |
|---|---|---|---|
| 3,595,825 | 7/1971 | Miller | 260/32.8 SB |
| 3,634,321 | 1/1972 | Nugent et al. | 260/33.4 SB |
| 3,691,128 | 9/1972 | Vincent | 260/33.8 SB |
| 4,035,453 | 7/1977 | Hittmair et al. | 260/29.1 SB |

*Primary Examiner*—Lewis T. Jacobs
*Attorney, Agent, or Firm*—Michael J. Doyle; E. Philip Koltos; John L. Young

[57] ABSTRACT

A process for wet mixing a silicone molding composition comprising mixing a silicone resin and a hydrocarbon solvent to form a solution of 10 to 50% by weight of solids and adding to the slurry a variety of fillers, a silicone plasticizer, a pigment and a catalyst to form a paste of about 85 to 95% by weight of solids; kneading the paste to thoroughly mix the ingredients and form a homogeneous mixture; and then removing most of the solvent and breaking of the composition left behind to form the appropriate size particles of a uniformly homogeneous silicone molding composition.

15 Claims, 1 Drawing Figure

PROCESS FOR PREPARING A SILICONE MOLDING COMPOSITION

BACKGROUND OF THE INVENTION

The present invention relates to silicone molding compositions and more particularly the present invention relates to the mixing of silicone molding compositions utilizing a wet mixing process.

Silicone materials are well-known and are highly regarded for their high temperature capabilities, for their resistance to the elements and for their good low temperature properties. In addition, silicon compositions are good electrical insulating materials. In the fabrication of the electrical components, if often becomes necessary to incorporate electrical components such as diodes and resistors in a composition which can cure to a hard solid which composition can withstand high temperatures and allow the electrical elements to operate at high temperatures without the composition bursting into flame and which composition has the proper ingredients for electrical insulative properties. In addition, it is desirable that if the composition encasing the electrical component breaks or burns because of excessively high temperatures due to fire from whatever source that the encasing composition when it burns will not give off toxic gases.

An encapsulating composition for electrical components is desired for several reasons. One reason is to protect the electrical components from dirt and moisture, and another reason is to protect the electrical component from mechanical shock. Accordingly, the encapsulant material has to be water tight or waterproof and also be of a hard substance which is sufficiently tough so that the casing can take mechanical shock without breaking. In addition, the encapsulant for the electrical component has to be able to take cycling from high temperatures to relatively low temperatures, that is room temperature, or below, without breaking or crazing and it has to be able to withstand high temperatures without burning or supporting a combustion.

Accordingly, it is highly desirable to have an encapsulant material which meets the above requirements and also can allow a non-electrical component to operate at temperatures 350° F. continuously without cracking or crazing and without supporting combustion.

Silicone molding compositions have been found especially suited to perform the above functions. Thus silicone molding compositions are especially suitable for encapsulating electrical components such as diodes and resistors and allowing such components to operate at temperatures of 350° F. continuously without supporting combustion or cracking or crazing. Such silicone molding compositions also can cycle from low temperatures to high temperatures without cracking or crazing depending on the presence of certain silicone additives.

Examples of such silicone molding compositions are for instance to be found in the patent application of Duane F. Merrill Ser. No. 750,993 filed Dec. 15, 1976, entitled "Process for Producing Low Molecular Weight Silicone Resins" and the patent of Alekna U.S. Pat. No. 3,666,830, both of which are incorporated into the present case by reference.

Such silicone molding compositions generally comprise a base silicone resin composed of trifunctional siloxy units and difunctional siloxy units, various types of fillers which typically are some form of precipitated or fumed silica, a pigment, a catalyst system and a plasticizer. The plasticizer is typically a silicone fluid of low viscosity which acts as a plasticizing fluid in the composition and allows the composition to have toughness properties, that is that the composition when cured, will be hard but not excessively brittle. The plasticizing fluid also imparts the properties to the composition so that it can withstand cycling from extreme temperature limits without cracking or crazing. It can be understood that the silicone binder resin, the main constituent of the silicone composition can be any of a number of silicone binder resins, such as the two of the disclosures herein above given.

In addition, the catalyst system usually comprises some assortment of lead compounds by themselves or in combination with a carboxylic acid or a carboxylic acid anhydride. There may be added other ingredients to the compositions, such as pigments other stabilizing additives, etc. If it is desired to use the composition, the mixture of the above ingredients is taken, melted and injected molded around the electrical component in a matter of seconds in the appropriate injection molding machinery. To determine if the silicone molding composition will perform satisfactorily for the encapsulating of electrical components there are various tests such as gel tests and spiral flow tests that are carried out on the composition.

One of the difficulties in the formulation of such silicone molding compositions was the determination that the final silicone molding composition would have the properties that were desired or requested for a particular application. Accordingly, to meet such difficulties or problems in the formulation of silicone molding compositions various types of binder resins have been developed and have been applied in the formation of silicone molding compositions. Another problem which is important, and to which the present efforts are also directed is the preparation of a silicone molding composition, that is the mixing of the various ingredients to form silicone molding composition particles which are homogeneous.

It is desired to have a silicone molding composition which is a homogeneous mixture of the ingredients since all the particles will flow at the same rate in the injection molding machinery, and result in a uniform performance in the injection molding machine and in the reduction of rejects due to improper cure and melting of the silicone molding composition. Accordingly, it is highly desirable to mix all the ingredients in the silicone molding composition as uniformly as possible so as to arrive at a silicone molding composition particles of uniform quality. Accordingly, it has been the practice to take the ingredients and mix them in a Ferrel Mixing System in which the ingredients are press-mixed under pressure similar to a screw extruding system in which the ingredients are dry mixed. The product is then taken and ground up to form the desired particle size of the silicone molding composition.

There were several problems with such a mixing system. In silicone molding compositions that utilized glass fibers, such fibers were not uniformly mixed with the silicone resin in the dry system. In addition, the extrusion mixing system had to be frequently repaired or replaced because of the excessive wear of the mixer components due to the abrasive nature of the glass fibers and other ingredients in the silicone molding composition mix.

In addition, the mixing of the ingredients in the Ferrel Mixing System in a dry state resulted in extensively high temperatures being experienced by the mixed components while being processed through the mixture. That is at temperatures of 200° C. or above. One disadvantage of such high temperatures was that there was a partial curing of the silicone molding composition, because of partial curing of the silicone binder resin and thus the silicone molding composition would not perform satisfactorily in the injection molding machine. The partial curing of the molding composition reduced the shelf-life of the molding composition, that is because of the partial curing, the molding composition would cure too quickly in the injection molding apparatus. Further, such partial curing of the molding composition would result in mixed compositions having different partial curing depending on the temperatures arrived at in the Ferrel Mixing System. As a result, mixed batches of different properties would result, and these would have to be combined to arrive at one batch with uniform properties. However, such properties would still vary from other batches that were mixed together and that were prepared subsequent or prior to the batches in question. Further, some compositions were partially cured to an extent that they were unworkable in injection molding machine, that is they would cure up as nodules in the silicone molding composition as soon as it was melted in the injection molding machine and such nodules could block up the ports in the molding equipment and result in malfunction.

Accordingly, for these reasons many batches did not meet the quality control requirements, that is there was too much partially cured molding composition in the batch, and the batch would then be discarded. Accordingly, it is one object of the present invention to have a simple and economic system for the mixing of the ingredients in the silicone molding composition.

It is an additional object of the present invention to have an economic and simple system for the mixture of ingredients in the silicone molding composition where there is no partial cure of the molding composition during the mixing.

It is still an additional object of the present invention to have a process for mixing the ingredients in a silicone molding composition by utilizing a solvent such that there is not excessive wear in the mixing apparatus and such that the mixing can be carried out without much difficulty.

It is still an additional object of the present invention to provide for the wet-mixing of the ingredients in the silicone molding composition utilizing a solvent such that the mixture of ingredients is carried out without giving off undue excesses of solvent to the atmosphere and which mixing is carried out in a continuous manner. These and other objects of the present invention are accomplished by means of the disclosure set forth herein below.

SUMMARY OF THE INVENTION

In accordance with the above objects and as provided by the present invention the process for preparing and mixing the silicone molding composition comprises:

(a) mixing a silicone resin comprised of R $SiO_{3/2}$ units and $R_2SiO$ units where R is a monovalent hydrocarbon radical and the R to Si ratio varies from 1.0 to 1.9 with organic solvents selected from the class consisting of aliphatic alcohol solvents, ketone solvents, aromatic solvents and aliphatic hydrocarbon solvents and mixtures thereof to form a solution of 10 to 50% by weight of solids;

(b) adding to the solution, in a kneading vessel, various types of fillers, a silicone plasticizer, a pigment and a catalyst to form a paste of about 85–95% by weight of solids;

(c) kneading the paste to thoroughly mix the ingredients;

(d) removing at least most of the remaining solvent to leave behind a silicone molding composition in which the ingredients are thoroughly mixed, and;

(e) reducing the silicone molding composition to particles of appropriate size.

Most preferably the process is carried out in a continuous manner and the steps (a), (b) and (c) are carried out at a temperature in the range of 25°–50° C.

The preferred organic solvents are acetone, toluene, xylene and hexane, methyl alcohol, isopropyl alcohol and mixtures thereof. It is preferred that 5–75% by weight of the solvent is an aliphatic alcohol having from 1–8 carbon atoms and more preferably isopropyl alcohol since that stabilizes the mixture and prevents gelling of the silicone resin in the slurry or paste mixture. The ingredients in the silicone molding composition can be any of the standard ingredients in silicone molding compositions or can be any new and additional ingredients such as a new silicone binder resin for such silicone molding compositions. The process for preparing and mixing the ingredients in the silicone molding composition should work for any silicone molding composition as disclosed herein below.

DESCRIPTION OF THE PREFERRED EMBODIMENT

Figure 1:
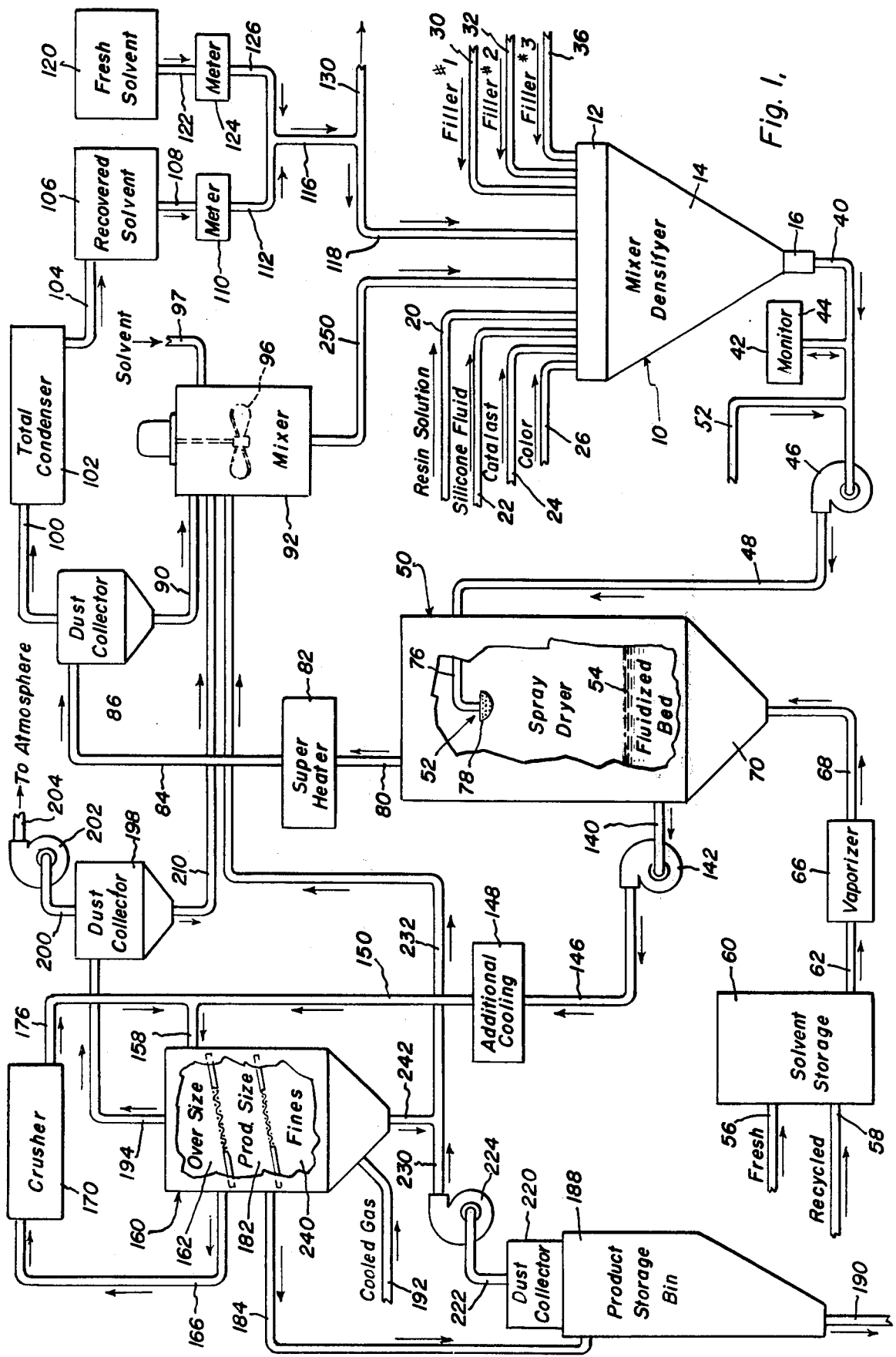

The silicone resin which is used as a binder resin in the silicone molding composition usually comprises a silicone resin composed of R $SiO_{3/2}$ units and $R_2SiO$ units where the R to Si ratio varies from 1.0 to 1.9 and R is a monovalent hydrocarbon radical. Such a resin generally has from 4–8% hydroxy groups and 2–4% alkoxy groups. The radical R, which is a monovalent hydrocarbon radical can be any monovalent hydrocarbon radical, such as alkyl radicals of 1–8 carbon atoms, methyl, ethyl, propyl, etc.; an alkenyl radicals such as vinyl, allyl, etc.; a cycloalkyl radical such as cyclohexyl, cycloheptyl, etc.; a mononuclear aryl radical such as phenyl, methylphenyl, ethylphenyl, etc. and halogenated monovalent hydrocarbon radicals such as haloalkyl radicals, for instance, 3, 3, 3 trifluoropropyl. Most preferably, R is selected from aliphatic radicals from 1–8 carbon atoms, phenyl radicals and vinyl radicals. The ratio of the trifunctional siloxy units to the difunctional siloxy units may vary anywhere from 1.0–1.9 to 1 and most preferably varies from 1.0–1.5 to 1. There are very many of these types of resins that can be produced depending on the process by which they are made.

One desirable way for producing such a silicone resin is to take an organohalosilane and hydrolyze it in a mixture of acetone, water and a water immiscible organic solvent, such as xylene or toluene to produce the desired silicone resin. It should be noted that it is preferred that the hydrolysis take place in a heterogeneous hydrolysis phase and that in such hydrolysis reaction acetone acts as a resin stabilizer. The organohalosilane that is hydrolyzed may be selected from mono-organotrihalosilanes and specifically mono-organotrichlorosilanes, a mixture of mono-organotrichlorosilanes and diorganodichlorosilanes and a mixture of a partial to complete alkoxylated reaction product of any of the above organochlorosilanes with an alcohol. Finally, there can be utilized in the reaction mixture any of the above organochlorosilanes in combination with an aliphatic alcohol of 1-8 carbon atoms where there is sufficient aliphatic alcohol in the reaction mixture to substitute 1 mole of the aliphatic alcohol per mole of chlorine in the organochlorosilanes. There is also a variation of the above process where the chlorosilanes are added to the heterogeneous hydrolysis mixture after first being mixed with part of the acetone. After the hydrolyzate is prepared, the water phase is separated out and the silicone hydrolyzate layer is washed several times with water to remove excess acid, desirably then the acid level can still be further reduced by neutralizing with a mild base such as acetic acid such that the silicone resin has acid content of 5 parts per million or less. The resulting silicone resin may then be obtained at any solids concentration by distilling off the solvent. The silicone resin may also be bodied by adding to the solvent resin solution a rare earth, diatomaceous earth and refluxing the mixture to body it or there can be added water to the resin solvent solution and the resulting mixture heated at elevated temperatures to partially body the resin. At any rate, and as well can be understood, there are many variations of the above process, each process producing a somewhat different resin as its end product which is suitable for certain applications.

The resin may then be taken as it is prepared by the foregoing preferred set of processes and dissolved in the organic solvent at 10-50% by weight of solids concentration. To such a solution there may be added the other ingredients. The solvents that may be utilized are any solvents that will dissolve the resin without deleteriously effecting the silicone resin.

It should be noted that the silicone resin of the instant case, which may be formed in accordance with the process set forth above, can be produced as a 100% solid composition by removal of the solvent. Then the silicone resin may be redissolved in a suitable solvent so that the solution may be utilized in the process of the instant case. It should be noted, however, that in most cases this is unnecessary since the solution of the silicone resin in the solvent, by adjusting it to a concentration of 10-50% solids by weight, is suited for being utilized in the mixing process of the instant case. The solvent that may be utilized are any water immiscible organic solvent, along with the ketone solvents and aliphatic solvents; such as, for instance aliphatic alcohol solvents, ketone solvents, aromatic solvents and chlorinated hydrocarbon solvents. Preferred among such a group of solvents are, of course, toluene, xylene, and n-hexane, methyl alcohol, isopropyl alcohol and mixtures thereof.

It is important that in the solvent solution that there be some aliphatic alcohol solvent and specifically an aliphatic alcohol of from 1-8 carbon atoms, since such aliphatic alcohols act as stabilizers to the silicone resin, that is they prevent the silicone resin from pre-curing or gelling. Accordingly, it is preferred that 5-75% by weight of the total solvent be and more preferably 20-50% by weight of the total solvent be an aliphatic alcohol of 1-8 carbon atoms, and it stabilizes the solution. One preferred stabilizer alcohol solvent is isopropyl alcohol.

Of course, it should be noted that the total solvent may be an aliphatic alcohol of 1-8 carbon atoms which would maximize the stabilizing effect of the solvent. It should be noted that an alcohol is not normally utilized as solvent for such silicone resins and accordingly, if the alcohol is utilized at these high concentrations, the original water immiscible organic solvent would have to be removed and the alcohol added as a solvent to form a slurry of the silicone resin in the alcohol. There is then formed a stabilized solution of the silicone resin in the solvent. It should be noted that preferably the solution or slurry is from 10-50% by weight of solids and more preferably from 25-50% by weight of solids. This slurry or solution is taken and is added to a kneading vessel. A kneading vessel is a mixing vessel for mixing a paste, which kneading action or mixing action of the vessel assimilates the kneading of dough. To this slurry or solution of silicone resin in the solvent there is then added the other ingredients of the silicone molding composition, either one at a time or all at one time to the solution or slurry. Examples of materials that can be added are for instance, glass rock, fiberglass, octamethylcyclotetrasiloxane treated fumed silica, octadecanol, a phenylmethyl polysiloxane fluid of 100 to 10,000 centipoise viscosity at 25° C., a pigment and as the catalyst system a combination of lead carbonate with benzoic acid or benzoic anhydride.

All of these ingredients are added to the slurry or solution of the binder resin in the solvent either one at a time or altogether in a kneading vessel. It is preferred that all ingredients be added concurrently in order to have a homogeneous mixture. Generally, the temperature of the kneading vessel can be at anywhere from 25° to 50° C. and more preferably 25° to 40° C. Although lower temperatures can be used, such lower temperatures makes the kneading action of the mixture tougher. If higher temperatures are utilized then there is a chance that there may be partial curing of the composition. In addition, the addition of ingredients is solely governed by the time necessary to properly mix the ingredients into the solution of the silicone resin solvent. This may be judged from experience.

It should be noted that only a kneaded paste will form a homogeneous mixture of the ingredients discussed above. It should also be noted that the process of the instant case is not limited to mixing the ingredients specified previously. In other types of silicone molding compositions having different ingredients, such different ingredients can be utilized to be mixed by the process of the instant case. The advantage of the process of the instant case is that it will thoroughly mix "hard to mix" and abrasive ingredients in a silicone molding composition with facility without undue wear of parts. "Hard to mix" ingredients are for instance glass fibers and glass rock.

Once the kneaded paste is formed and the mixture is homogeneous in composition, then the paste can simply be taken and heated at elevated temperatures say, at a temperature of 80°-90° C. for up to 15 seconds to remove the solvent and then the dried product that is formed can be ground up to form the homogenous silicone molding composition having particles of the desired size and of uniform composition. The solvent that is removed may be collected by an overhead hood or other fan or blower apparatus so that it is not released into the atmosphere but is taken and condensed and reused in the process of the instant case.

However, in a more sophisticated process of the instant case, the kneaded paste may simply be taken to a spray dryer in which most of the solvent is removed by spray drying to yield particles of the silicone molding composition. It is preferred that the solvent be removed by passing a superheated solvent vapor through the sprayer in a closed system where superheated solvent will vaporize and remove the solvent from the molding compound. The vapors will be condensed up to 100% resulting in that solvent recovery. This step forms one of the basic improvements in the process of the instant case. These particles of the silicone molding composition may then be pumped to a separator where the appropriate size particles are then taken and stored in a storage bin and the other particles are recycled for further treatment. For instance, the oversized particles may be recycled to a grinder where they are further ground down to the right size and then passed back to the separator to be reprocessed. The fines may simply be taken and recycled back to the kneading vessel and added to the silicone molding composition and re-homogenized into the mixing process. The solvent may then be taken, that is, removed in the spray drier and condensed in a closed system, recycled to the kneading vessel as additional solvent for dissolving the silicone resin and for forming the appropriate type of paste in the kneading vessel.

It should be noted that the paste in the kneading vessel should have a solids content of anywhere from 75–95% by weight and more preferably a solids content of anywhere from 85–95% by weight. It is very important that the paste in the kneading vessel have the above consistency since if it is more fluid then the appropriate mixing action will not take place. Thus, the appropriate mixing or the forming of a homogeneous mixture cannot take place in a slurry. The mixture has to have the consistency of a paste before it can be mixed into homogeneity in the kneading vessel or other types of mixing vessel. Accordingly, the solids content of the mixture after all of the ingredients have been added in the kneading vessel is very important.

Once the kneaded paste of the mixture is kneaded to homogeneity, then the solvent is simply evaporated to yield the dry material. The advantage of a spray dryer is that it will yield material in the form of particles which can be easily processed in the separator. These particles would have about 1–2% solvent in them, however, such solvent can be vented to the atmosphere in most cases without creating a pollution problem. If need be, appropriate venting apparatus can be attached to the separator to remove all of the solvent and collect it for disposal or for reuse in the process. It should be noted that the solvent that is removed from the spray dryer can simply be processed through dust collectors to remove any and all dust that is in the solvent and then the solvent can then be passed back into the kneading vessel.

Advantageously, there may be utilized a superheated solvent in the spray dryer, such that when the paste is sprayed out in the spray dryer to dry it, the superheated solvent will contact the paste as it is sprayed and remove at least most of the solvent from the paste as a vapor to leave behind particles containing 1–2% of the original solvent. The superheated solvent which has passed through the paste and removed at least most of the solvent from such paste can then be taken from the spray dryer, superheated to make sure that it remains in a gases phase and then processed through dust collectors to remove dust that becomes entrained as a result of the passage of the solvent through the spray dryer. Finally, the solvent can be condensed and be reutilized in the process as it is needed.

There are many variations that can be made of this process. The necessary part of the process is the formation of a paste of the silicone binder resin in the solvent and adding to it the other ingredients of the silicone molding composition either one at a time or in mass to form a paste, preferably of 85–95% by weight of solids, and then kneading the paste to form a homogeneous composition.

Accordingly, the manner in which the solvent is removed from paste can vary as is desired and can suit a particular need and a particular locality. It is only necessary in this application to show the basic steps in the invention of the instant case. However, a preferred way to carry the process of the instant case has been developed.

FIG. 1 is a Schematic diagram of the preferred process of the instant case.

In FIG. 1 there is a Mixer Densifier, 10, having an upper section, 12, and a bottom section or a conical section, 14, and out let section, 16, a silicone resin solution of the binder resin solution of 10–50% of solids is added to the mixer densifier or kneading vessel 10 through line 20, while other silicone fluids are added through line 22, catalyst is added through line 24 and colors, if any, or pigments may be to the densifier through line 26. To Mixer Densifier 10 there may be also added a first type of filler through line 30, a second type of filler through line 32 and other ingredients through line 36, all of which ingredients that is resin solution through line 20, silicone fluid through line 22, catalyst through line 24, pigments through line 26, filler through line 30 and second type of filler through line 32 and the other ingredients through line 36 are added to the top of section 12 of Mixer Densifier 10. As the paste that is formed in the Mixer Densifier 10 works down through the conical section 14 by the time it reaches output section 16, it is a homogeneous paste of the appropriate size.

It should be noted that the process of FIG. 1, is totally continuous. The homogeneous paste or a desirably homogeneous paste coming out of section 16 of densifier 10 passes through line 40 by monitor 42 connected to line 44 and then it is carried by a pump 46 into line 48 into spray dryer 50. Monitor 42 determines if the composition or paste in line 40 has the proper consistency and if necessary solvent is added to the composition through line 52 after monitor 42 into line 40 to give the paste the proper consistency for spray drier 50. Spray drier 50 has a section 52 and fluidized bed 54 where the dry particles of the spray dryer are formed thereto and are collected in the spray dryer. There is passed fresh and recycled solvent through lines 56 and 58 into solvent storage tank 60 which is then passed through line 62 as needed into vaporizer 66. The superheated vaporized solvent is then passed through line 68 into the bottom 70 of spray dryer 50, such that is passes through fluidized bed 54 of spray dryer 50.

The paste in line 48 passes through spray dryer section 52 having line 76 and head 78 to form particles of a silicone molding composition which fall onto fluidized bed 54 of spray dryer 50. The solvent vapor that is formed along with the vaporized solvent coming into the spray dryer through the fluidized bed 54 through line 68 is then passed through line 80 into superheated 82 where it is further heated, and passed through line 84 into dust collector 86. The dust or silicone molding composition dust is removed in dust collector 86 and passed through line 90 into mixing tank 92 having agitator 96 and solvent addition line 97. The superheated solvent that is removed or purified in dust collector 86 is then passed through line 100 to condenser 102 wherein the gaseous solvent is then liquified and passed through line 104 into recovery solvent tak 106. The recovered solvent which is collected in tank 106 is then passed through line 108 and metered through meter 110 as needed into line 112 which passes into line 116 which connects with line 118 which recycles the recovered solvent as needed back into Mixer Densifier 10.

Along with the recovered solvent in tank 106, there is fresh solvent in tank 120 which is metered through line 122 through meter 124. The new fresh solvent is then metered through line 122 past meter 124 into line 126 which joins line 116 along with line 112 so that the recovered purified solvent along with the fresh solvent may be passed through line 118 into Mixer Densifier 10 as needed or it may be passed through line 130 with the appropriate valves back to lines 56 and 58 into solvent tank 60 as needed. Going back to spray dryer 50, there is formed in spray dryer 50 homogeneous particles of the silicone molding composition containing 1 to 2% of solvent vapor and which fluidized bed of silicone molding composition particles is in the fluidized condition as the result of the vaporized solvent passing into the spray dryer 50 through line 68. The fluidized particles in spray dryer 50 are taken continuously through fluidized bed 54, through line 140 and pump 142, passed through line 146 and through cooling chamber 148 and then passed through line 150 and 158 into the top of separator 160. Separator 160 contains an oversized section 162 to which the oversized particles are segregated and passed through line 166 through crusher 170 to be ground to the desired sizes and then passed back from crusher 170 through line 176 and lines 158 back into the separator 160. Separator 160 also contains an appropriate product particle section 182 in which the appropriate sized particles are segregated which are then passed through line 184 into product storage bin 188 where the particles are removed from the product storage bin 188 where the particles are removed from the product storage bin 188 as needed through line 190. Cool gas is passed to the bottom of separator 160 through line 192 so as to cool the particles that are congregated in separator 160 that were passed through it from spray drier 50 through lines 140, pump 142, line 146, cooler 148 and lines 150 and 158.

The cool gas as well as the solvent, the 1–2% solvent that is remaining in the particles that are removed from the spray drier are removed from separator 160 and passed through line 194 through dust collector 198 where the purified gas containing the remaining solvent pass through line 200 through pump 202 through line 204 into the atmosphere. The fines from dust collector 198 are then passed through line 210 into fine collector 92. Any fines or dust that may be present in storage bin 188 is passed through dust collector 220 through line 222 into pump 224 through line 230 and line 232 into fines mixing tank 92. Further the fines from separator 160 which are separated in the fine separating section 240 in separator 160 passed through line 242 into line 232 along with the fines from line 230 emanating from the storage bin 188 and passed through line 232 as stated previously into fines collecting tank 92. All the fines from lines 90, 210 and 232 are mixed in collecting tank 92 utilizing mixing agitator 96 with additional solvent as needed brought through line 97 to form a homogeneous mix of the fines and the fines are then passed through mixer and mixing tank 92 through line 250 back into Mixer Densifier 10 to be utilized in forming a uniform molding composition as desired.

It should be noted that the entire process as outlined above and as shown in FIG. 1 is completely continuous, which reduced the cost and expense of producing a uniformly mixed silicone molding composition while increasing the speed by which such compositions can be mixed and formed.

It should be noted that the process of the instant case can also be carried out on a batchwise, stepwise fashion without being totally continuous as is disclosed in the preferred embodiment. The wet mixing process of the instant case can be utilized with advantage to prepare a uniformly mixed homogeneous silicone molding composition without the disadvantages of the prior dry mixing procedures.

The Examples below are given for the purpose of illustrating the practice of the present invention. They are not given for any purpose or intent for illustrating the limits and bounds of the instant invention as claimed. All parts in the Examples are by weight.

It should be noted that the reduction to practice of the instant invention in Examples was batchwise since it was not carried out in a continuous manner because of the fact that the invention was easier to reduce to practice utilizing such a batchwise procedure.

EXAMPLE 1

The results below show the mixing of silicone molding compositions having the ingredients that will be set forth hereinbelow with various solvents, toluene, hexane, acetone, hexane and methanol and give a comparison between the mixtures that are dissolved and mixed in the foregoing solvents as compared to the same composition which was mixed in a dry mixing hot melt compounding procedure. The properties that are compared in the compositions show a gel time which is the gelling of the resin set on a hot plate at 200° C. The flow in inches of the composition when measured in a spiral flow test, that is the flow of the composition before it gels on the surface in the form of a spiral which is heated at 177° C. is given and the Hot Shore D properties of the cured composition. The ingredients that were mixed in all cases were as follows:

To 26 parts of a resin composed of 47.5 mole percent of monomethyltrifunctional siloxy units, 47.5 mole percent of monophenyltrifunctional siloxy units, 5.0 mole percent of dimethyldifunctional siloxy units, 0.0 mole percent of diphenyldifunctional siloxy units, 40 parts of glass rock, 24 parts of fiberglass, 3.1 parts for 1400 grams of octymethylcyclotetrasiloxane treated fumed silica, 0.6 parts of phenyl-containing dimethylpolysiloxane fluid of 100 centipoise viscosity at 25° C., 0.6 parts of the phenyl-containing dimethylpolysiloxane fluid of 100 centipoise viscosity at 25° C., 0.2 parts of a pigment and 0.6 parts of a mixture of lead carbonate and benzoic anhydride. The above ingredients were mixed in which procedure first the resin was dissolved in the solvent shown in Table 1 below and then to the resulting solution there were added the other ingredients which produced the paste in the case of the wet process mixing procedure. The paste was put in trays in a vacuum oven and was heated at temperatures of 80°–90° C. for 10 minutes to remove the solvent and then the dried material was then ground up to yield a silicone molding composition which had the following properties shown in Table 1 below when tested.

TABLE I

| Composition | Solvent Used | Avg. Gel Time (seconds) | Flow(in.) | Hot Shore D |
|---|---|---|---|---|
| A | Toluene | 35 | 40 | 50 |
| B | Hexane | 28 | — | 9 |
| C | Acetone | 32 | 21 | 70 |
| D | Hexane Methanol | 35 | 23 | 63 |
| Hot Melt Compounding Average | None | 30 | 40 | 55–60 |

The results in Table I above show that a molding composition was obtained utilizing the procedure of the instant invention with comparable properties with that obtained utilizing the prior hot melt dry mixing procedure.

The mixer used in the procedure of the present case to mix the composition was a Hobart Mixer.

There was prepared a wet mixture of the above compositions as disclosed previously, which were mixed in toluene, utilizing a 5 gallon dough mixer. The results of the tests of the silicone molding composition which was tested after the uniform mixture of the silicone molding composition was prepared is shown in Table II below.

TABLE II

Results of wet process tests using the 5-gal. dough mixer - solvent mixture of 75% toluene and 25% isopropyl alcohol

| | | |
|---|---|---|
| (1) Gel Time | = | 28/37 seconds |
| (2) Flow | = | 24 inches |
| (3) Hot Shore D | = | 2½ min. = 70 |
| (4) Hot Flexural Strength | = | Good |

Then there was prepared the same composition in the same silicone molding composition prepared in accordance with the process of the instant case utilizing toluene as a solvent in which there was utilized as a mixing apparatus a dough mixer and a beaker with manual mixing. The results of said tests are shown in Table III below.

TABLE III

| Composition | Type of Mixing | Gel Time (Sec.) | Flow (In.) | Hot Shore D | Hot Flex Strength | Remarks |
|---|---|---|---|---|---|---|
| E | dough mixer | 28/37 | 24 | 62/70 | Good | Batch dried under vacuum Good resin distribution. |
| F | Beaker | 32/38 | 32 | 65/70 | Good | Blend of dried Comp. E and wet Comp. F. |
| G | dough mixer | 32/40 | 38 | 60 | Good | 15% increase in resin and in catalyst. |

The results of Table III above show that silicone molding composition with good properties was obtained utilizing the process of the instant case for mixing the ingredients. The above silicone molding composition was also mixed utilizing the process of the instant case and utilizing as a solvent 75% toluene, 25% isopropyl alcohol.

The properties of the silicone molding composition that was prepared utilizing such a solvent in accordance with the process of the instant case was compared with the properties of a dry mix composition having the same ingredients and the same amount of ingredients and which was mixed using Prior Art methods and a competitive product. The results are set forth in Table IV.

TABLE IV

| | Dry Process | Wet Process | Competitive Product |
|---|---|---|---|
| Gel time - 350° F. initial/final - sec. | 28/40 | 34/63 | 32/60 |
| Spiral flow - 350° F. 1000 psi - in. | 35 | 42 | 42 |
| Hot strength - 350° F. 1½ min. - Shore D | 55–60 | 55–60 | 45 |
| Thermal shock resistance 175° C.-0° C. Cycles to failure | 1 | 1 | 10 |
| Pressure cooker performance, 4 hrs. (G. Gain) | 0.23 | 0.28 | 0.23 |

The results in Table IV indicate that the wet process of the instant case produces silicone molding compositions with excellent silicone molding properties.

I claim:

1. A process for preparing and mixing a silicone molding composition comprising (a) mixing a silicone resin compound of $R\ SiO_{3/2}$ units and $R_2SiO$ units where R is a monovalent hydrocarbon radical and the R to Si ratio varies from 1.0 to 1.9 with an organic solvent selected from the class consisting of aliphatic alcohol solvents, ketone solvents, toluene, xylene, chlorinated hydrocarbon solvents and mixtures thereof to from a solution of 10 to 50% by weight solids; (b) adding to the solution in a kneading vessel various types of fillers, a silicone plasticizer, a pigment and a catalyst to form a paste of 75 to 95% by weight solids; (c) kneading the paste to thoroughly mix the ingredients; (d) removing at least most of the remaining solvent to leave behind a silicone molding composition in which the ingredients are thoroughly mixed and (e) reducing the silicone molding composition to particles of the appropriate size.

2. The process of claim 1 wherein steps (a), (b) and (c) are carried out at a temperature in the range of 25° to 50° C.

3. The process of claim 1 wherein the organic solvent is selected from the class consisting of acetone, n-hexane, methyl alcohol, isopropyl alcohol and mixtures thereof.

4. The process of claim 1 wherein from 5 to 75% by weight of the solvent is an aliphatic alcohol of from 1 to 8 carbon atoms which alcohol acts as a stabilizer.

5. The process of claim 1 wherein step (d) is carried out by heating the paste at 80°–90° C. for up to 15 seconds to remove the solvent and step (e) is carried out by grinding the residue.

6. The process of claim 1 wherein step (d) and (e) are carried out by spray drying the paste in spray drying equipment in which the paste is contacted during the spray drying with a superheated solvent so that the solvent is removed from the paste and is removed as a vapor and is recycled to be used to dissolve additional silicone molding ingredients in a continuous process.

7. The process of claim 6 wherein the particles obtained from the spray dryer are processed through a separator wherein the particles of the right size are passed to a storage bin wherein the over-sized particles are ground and passed back to the separator for reprocessing and wherein the fines are passed with a minor amount of solvent back to the kneading vessel in a continuous manner.

8. The process of claim 7 wherein the superheated solvent is passed to the spray dryer continuously as the solvent removed from the paste is recovered, purified by passing through dust collectors and then along with fresh solvent recycled to said kneading vessel and said spray dryer as needed in a continuous manner.

9. The process of claim 1 wherein the silicone resin contains from 4 to 8% hydroxy groups and 2 to 4% alkoxy groups.

10. The process of claim 1 wherein the various types of fillers are ground glass, glass fibers and fumed silica.

11. The process of claim 10 wherein the fumed silica is treated with an octamethylcyclotetrasiloxane.

12. The process of claim 1 wherein the catalyst is a mixture of lead compound and an acid selected from the class consisting of carboxylic acids and carboxylic anhydrides.

13. The process of claim 12 wherein the catalyst is a mixture of lead carbonate and benzoic anhydrides.

14. The process of claim 1 wherein the silicone plasticizer is a phenyl-containing dimethylpolysiloxane fluid of a viscosity varying from 100 to 10,000 centipoise at 25° C.

15. A continuous process for preparing and mixing a silicone molding composition comprising (a) mixing a silicone resin composed of $R\ SiO_{3/2}$ units and $R_2SiO$ units where R is a monovalent hydrocarbon radical and the R to Si ratio varies from 1.0 to 1.9 with a solvent selected from the class consisting of aliphatic alcohol solvents, ketone solvents, toluene, xylene, and chlorinated hydrocarbon solvents and mixtures thereof to form a slurry or a solution of 10 to 50% solids; (b) adding to the slurry or the solution in a kneading vessel various types of fillers, a silicone plasticizer, a pigment and a catalyst to form a paste of 85% to 95% by weight solids; (c) kneading the paste to thoroughly mix the ingredients wherein the above steps are carried out at a temperature in the range of 25° to 50° C.; (d) continuously passing the paste in contact with superheated solvent vapor in a spray dryer; (e) removing at least most of the solvent from said paste to form solid particles of said silicone molding composition and continuously removing said solvent as well as said superheated solvent from said sprayer dryer purifying said superheated solvent by passing it through dust collectors to remove solid particles therefrom and passing it along with fresh solvent as needed into said spray dryer and said kneading vessel; (f) transferring said solid particles to a separator wherein the particles of the appropriate size are separated continuously and transferred into a storage bin, wherein the over-sized particles are separated, reground and passed back into said separator for sizing; (g) transferring the fines and any solvent collected in said separator back into said kneading vessel continuously; and (h) collecting from said storage bin the appropriate size solid particles of a uniformly mixed silicone molding composition.

* * * * *